United States Patent
Riss et al.

(10) Patent No.: US 11,726,449 B2
(45) Date of Patent: Aug. 15, 2023

(54) PACKING ARRANGEMENT DETERMINATION FOR 3D PRINTING OF OBJECTS

(71) Applicants: INSTITUTO ATLANTICO, Fortaleza (BR); HEWLETT-PACKARD DEVELOPMENT COMPANY, L.P., Spring, TX (US)

(72) Inventors: Marcelo Aita Riss, Porto Alegre (BR); Thiago Barbosa Lima De Moura, Fortaleza (BR); Alyne Gomes Soares Cantal, Fortaleza (BR); Ana Patricia Del Angel, Loma Bonita Guadalajara (MX); Jun Zeng, Palo Alto, CA (US); Scott A White, Boise, ID (US); Sebastia Cortes i Herms, Sant Cugat del Valles (ES)

(73) Assignees: HEWLETT-PACKARD DEVELOPMENT COMPANY, L.P., Spring, TX (US); INSTITUTO ATLANTICO, Fortaleza (BR)

( * ) Notice: Subject to any disclaimer, the term of this patent is extended or adjusted under 35 U.S.C. 154(b) by 49 days.

(21) Appl. No.: 16/606,967

(22) PCT Filed: Feb. 19, 2018

(86) PCT No.: PCT/US2018/018638
§ 371 (c)(1),
(2) Date: Oct. 21, 2019

(87) PCT Pub. No.: WO2019/160565
PCT Pub. Date: Aug. 22, 2019

(65) Prior Publication Data
US 2020/0379436 A1    Dec. 3, 2020

(51) Int. Cl.
*G05B 19/4099*  (2006.01)
*G06T 15/00*    (2011.01)

(52) U.S. Cl.
CPC .......... G05B 19/4099 (2013.01); G06T 15/00 (2013.01); *G05B 2219/49023* (2013.01)

(58) Field of Classification Search
CPC ...... G05B 19/4099; G05B 2219/49023; G06T 15/00
See application file for complete search history.

(56) References Cited

U.S. PATENT DOCUMENTS

| | | | | |
|---|---|---|---|---|
| 5,379,371 | A | * | 1/1995 | Usami ............... G06T 17/20 345/428 |
| 10,489,816 | B1 | * | 11/2019 | Duke ................ G07F 17/26 |

(Continued)

FOREIGN PATENT DOCUMENTS

| CN | 103144447 B | 12/2015 |
|---|---|---|
| JP | 11249835 A | 9/1999 |
| WO | WO2015027464 A1 | 3/2015 |

OTHER PUBLICATIONS

3D Printing at Scale: the Fuse Pavilion, Sep. 6, 2017, https://formlabs.com/blog/3d-printing-at-scale-fuse-pavilion/.

(Continued)

*Primary Examiner* — Thomas C Lee
*Assistant Examiner* — Ameir Myers
(74) *Attorney, Agent, or Firm* — Shook, Hardy & Bacon L.L.P.

(57) ABSTRACT

According to examples, an apparatus may include a processor and a memory on which is stored machine readable instructions that when executed by the processor are to cause the processor to access a reduced resolution three-dimensional (3D) model file of an object to be built in a build bed of a 3D printing system, the reduced resolution 3D model file comprising a reduced resolution file of a first resolution (Continued)

3D model file of the object. The instructions may also cause the processor to determine a packing arrangement for the object and a plurality of other objects to be built in the build bed through use of the reduced resolution 3D model file and output the determined packing arrangement for the 3D printing system to print the object and the other objects.

13 Claims, 4 Drawing Sheets

(56) References Cited

U.S. PATENT DOCUMENTS

| | | | |
|---|---|---|---|
| 2009/0259450 A1* | 10/2009 | Cleary | G06T 13/60 |
| | | | 703/6 |
| 2012/0313939 A1* | 12/2012 | Anttila | G06T 9/00 |
| | | | 345/420 |
| 2014/0046733 A1* | 2/2014 | Grichnik | G06F 30/20 |
| | | | 705/7.37 |
| 2014/0336808 A1 | 11/2014 | Taylor et al. | |
| 2015/0142152 A1 | 5/2015 | Rezayat | |
| 2015/0269290 A1 | 9/2015 | Nelaturi et al. | |
| 2016/0117438 A1 | 4/2016 | Witzel | |
| 2016/0158962 A1 | 6/2016 | Balistreri et al. | |
| 2016/0222766 A1* | 8/2016 | Rowan | E21B 49/00 |
| 2016/0364124 A1* | 12/2016 | Heater | G06F 3/011 |
| 2016/0371398 A1 | 12/2016 | Sugiura | |
| 2017/0173889 A1* | 6/2017 | Thomas-Lepore | H04L 51/046 |
| 2018/0093417 A1* | 4/2018 | Yaw | G05B 19/4099 |
| 2018/0272733 A1* | 9/2018 | Moriya | B41J 2/17546 |
| 2020/0026806 A1* | 1/2020 | Ullom | G06T 15/005 |

OTHER PUBLICATIONS

Reichle, F., "Why We Implemented 3MF for the Trinckle 3D Customizer, and You Should, Too", 3MF Consortium, Oct. 29, 2015, 6 pages, https://3mf.io/why-we-implemented-3mf-for-the-trinckle-3d-customizer-and-you-should-too/.

Expert Software for Additive Manufacturing, Oct. 6, 2016, http://www.ratc.com.tw/wp-content/uploads/2017/05/Netfabb-2017-Brochure-Digital-.pdf.

Fabian, How to Reduce the File Size of .STL and .OBJ 3D Models, Jun. 10, 2017, https://i.materialise.com/blog/reduce-the-file-size-of-stl-and-obj-3d-models/.

Greenfield, D., Industrial Scale 3D Printing: a New Approach, May 12, 2015, https://www.automationworld.com/industrial-scale-3d-printing-new-approach.

Baumann, F. et al., "Additive Manufacturing, Cloud-based 3D Printing and Associated Services—Overview", Journal of Manufacturing and Materials Processing, Oct. 17, 2017, 60 pages https://www.google.co.in/url?sa=t&rct=j&q=&esrc=s&source-web&cd=1&ved=0ahUKEwjD1ZH0_PnWAhVHKY8KHV_LDXEQFggIMAA&url=http%3A%2F%2Fwww.mdpi.com%2F2504-4494%2F1%2F2%2F15%2Fpdf&usg.

Dickinson et al., "Packing Subsets of 30 Parts for Layered Manufacturing", International Journal of Smart Engineering System Design, vol. 4, No. 3, 2002, pp. 147-161.

Netfabb, "Netfabb Professional 5.2 User Manual," Chapter 5, Part Management, 5.5 position and Scale ED, Jul. 29, 2014, pp. 68-73.

* cited by examiner

PACKING ARRANGEMENT DETERMINATION FOR 3D PRINTING OF OBJECTS

BACKGROUND

In three-dimensional (3D) printing, an additive printing process is often used to make three-dimensional solid objects from a digital model. Some 3D printing techniques are considered additive processes because they involve the application of successive layers or volumes of a build material, such as a powder or powder-like build material, to an existing surface (or previous layer). 3D printing often includes solidification of the build material, which for some materials may be accomplished through use of heat and/or a chemical binder. A relatively large number of objects may be fabricated concurrently, e.g., as part of the same build process, to increase the speed at which the objects may be fabricated.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
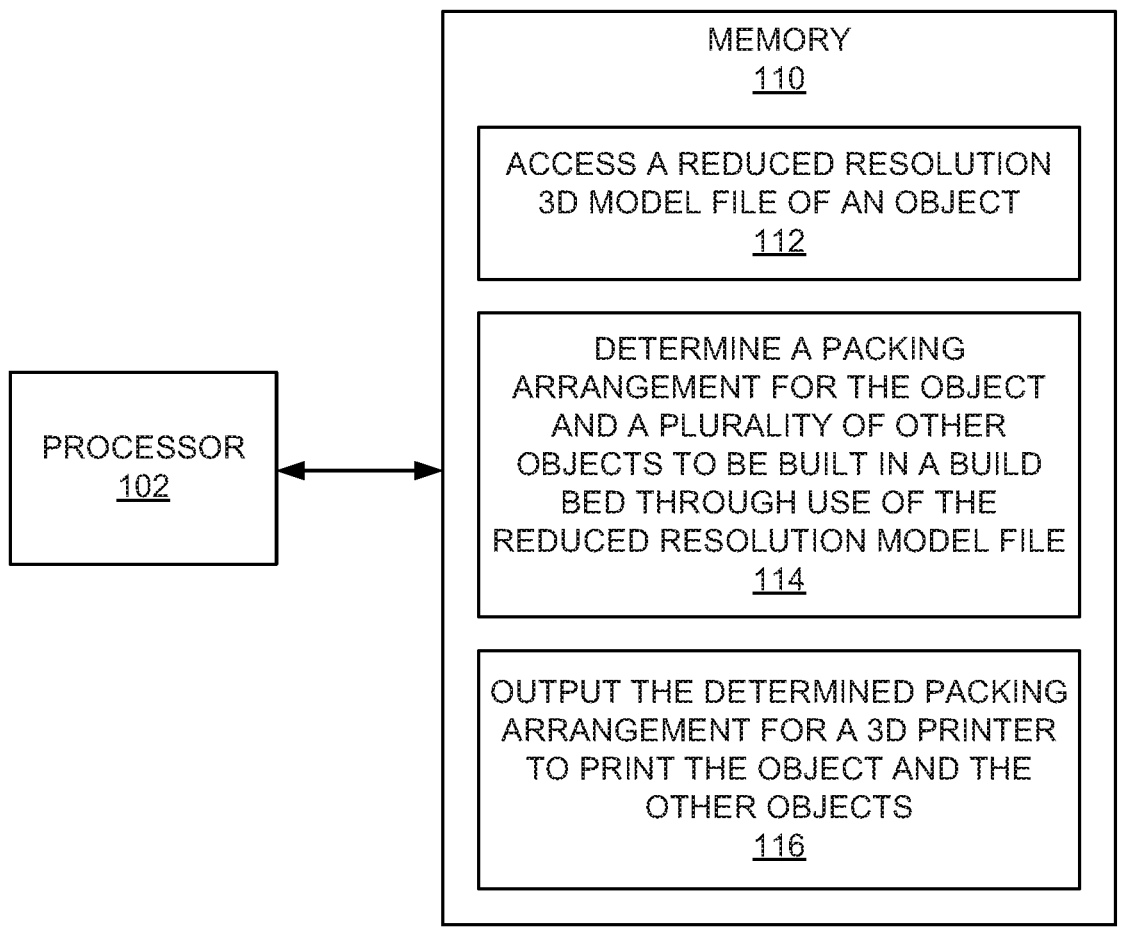
FIG. 1 shows a block diagram of an example apparatus that may determine a packing arrangement for a plurality of objects using a reduced resolution 3D model file of an object.

Mass production 3D printing systems for large scale manufacturing may rely on large bed sizes and auto-packing algorithms in order to maximize throughput and drive down production costs. Auto-packing algorithms and software execution may not be able to load a relatively large number of copies of objects in memory and process all of the objects at the same time. In addition, as the number of objects continues to increase, it may not be possible to load and manipulate all of the data corresponding to the objects in order to achieve an optimized configuration of the objects to build without taking up a potentially excessive amount of processing and memory, e.g., more processing and memory than may be practical in terms of cost and/or other factors.

In addition, visualization tools for visualizing the packing arrangement may also encounter processing and memory issues. Visualization tools may not need only to use memory to store definitions of the 3D objects, but may also show the copies of the objects on a display device. The display of the objects in a determined packing arrangement may add an extra overhead when displaying the objects, which may make display of a large number of objects impractical or not possible. For instance, the large number of objects may prevent previewing operations to be available where an operator may see the fulfilled print bed and rotate or zoom the fulfilled bed to have a better idea as to how the final build may appear. In addition, editing operations where an operator may manually add/remove objects from the build and/or re-render the build may not be available.

Disclosed herein are apparatuses and methods to generate a packing arrangement for multiple objects, visualizing the packing arrangement, manipulating the packing arrangement, and printing the multiple objects according to the packing arrangement that may overcome some or all of the issues discussed above. Particularly, for instance, the apparatuses and methods disclosed herein may use reduced resolution 3D models of the objects instead of the full resolution 3D models of the objects in rendering the objects. In addition, the rendered versions of the reduced resolution 3D object files may be used in the generation of the packing arrangement. As a result, the packing arrangement may be generated using the reduced resolution 3D object files and may thus have a smaller file size as compared with a packing arrangement that is generated using the full resolution 3D model file. In addition, the smaller file size of the generated packing arrangement may enable the packing arrangement to be displayed and manipulated using relatively less computing and memory resources.

In some examples, the apparatus may execute a packing operation to determine the packing arrangement, in which the packing arrangement may identify the locations within a print bed at which each of the objects are to be printed during a single printing operation. That is, the determined packing arrangement may be an arrangement of the objects in which the number of objects that may be printed during the single printing operation may be maximized while meeting, for instance, thermal considerations, e.g., reduction of effects of thermal bleed, which may occur during printing of the objects.

Also disclosed herein is a client device that may produce the reduced resolution 3D model file from a first resolution 3D model file of the object file. The client device may also map an identifier to the first resolution 3D model file and the reduced resolution 3D model file and may store the first resolution 3D model file and the identifier in a data store. The client device may further submit the reduced resolution 3D model file to the apparatus such that the apparatus may use the reduced resolution 3D model file to determine the packing arrangement. The client device may also receive the determined packing arrangement or a visual representation of the determined packing arrangement from the apparatus and may display the determined packing arrangement on a display device. In addition, the client device may receive input from a user to modify the determined packing arrangement and the client device may modify the determined packing arrangement according to the received input.

The client device may further submit a printing request to a 3D printing system to print the objects. The printing request may include the determined packing arrangement or the modified packing arrangement along with the identifier or identifiers of the first resolution 3D model files of the objects in the packing arrangement. The 3D printing system may access the first resolution 3D model files from a data store and may use the first resolution 3D model files to print the objects.

Through implementation of the apparatuses and methods disclosed herein, the auto-packing algorithms may be implemented on a larger number of objects because the file sizes of model files used in the auto-packing algorithms may be relatively smaller than the file sizes of model files used to print the objects. In addition, the smaller file sizes may result in the determined packing arrangements to be relatively smaller, which may enable the determined packing arrangements to be visualized with relatively lower processing and memory resources.

Before continuing, it is noted that as used herein, the terms "includes" and "including" mean, but is not limited to, "includes" or "including" and "includes at least" or "including at least." The term "based on" means "based on" and "based at least in part on."

With reference first to FIG. 1, there is shown a block diagram of an example apparatus 100 that may determine a packing arrangement for a plurality of objects using a reduced resolution 3D model file of an object. It should be understood that the example apparatus 100 depicted in FIG. 1 may include additional features and that some of the features described herein may be removed and/or modified without departing from the scope of the apparatus 100.

Generally speaking, the apparatus 100 may be a computing device, a server apparatus, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device.

The apparatus 100 may also include a memory 110 that may have stored thereon machine readable instructions 112-116 (which may also be termed computer readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The processor 102 may fetch, decode, and execute the instructions 112 to access a reduced resolution 3D model file of an object to be built in a build bed of a 3D printing system, which may also be referenced as a 3D printing system. The reduced resolution 3D model file may be a reduced resolution file of a first resolution 3D model file of the object and may thus have a relatively smaller file size as compared to the first resolution 3D model file. According to examples, the level of resolution reduction from the first resolution 3D model file to the reduced resolution 3D model file may be based on a predefined resolution reduction level. In addition or in other examples, a user may define the level of reduction in the resolution of the first resolution 3D model file to generate the reduced resolution 3D model file. In any of these examples, the level of resolution reduction may be sufficient to make the file size of the 3D model file simpler to move from one device to another, e.g., over a network, and manipulate while being insufficient to prevent the object from being visually identifiable when an image of the reduced resolution 3D model file is displayed.

In any regard, the processor 102 may access the reduced resolution 3D model file from a client device, a data store, over a network, or the like. In addition, the processor 102 may not download the first resolution 3D model file of the object to be printed. As the reduced resolution 3D model file may have a relatively smaller file size as compared with the first resolution 3D model file, the processor 102 may download a relatively smaller amount of data corresponding to the object to be built. As such, for instance, the processor 102 may utilize a relatively smaller amount of network bandwidth in accessing the data corresponding to the object to be built.

The processor 102 may fetch, decode, and execute the instructions 114 to determine a packing arrangement for the object and a plurality of other objects to be built in the build bed through use of the reduced resolution 3D model file. The packing arrangement may be defined as an arrangement in which the objects may be fabricated in the build bed of a 3D printing system during a single printing operation. As the objects may have irregular shapes and/or sizes with respect to each other, the number of objects that may be built during a single printing operation may depend upon the manner in which the objects are arranged in the build bed during the printing operation. In some examples, the processor 102 may determine a packing arrangement that results in a maximum number of objects being built during a single printing operation, e.g., in a common build bed, build envelope, or the like. The processor 102 may also determine the packing arrangement while considering other factors, such as maintaining sufficient space between the objects to prevent thermal bleed of the objects from affecting the quality of the objects beyond a predefined level.

In determining the packing arrangement for the object and the other objects, the processor 102 may implement computationally intensive calculations pertaining to different positions and rotations of the object and the other objects. That is, the processor 102 may implement computationally intensive calculations to determine a packing arrangement that results in each of a desired number of objects to be built in a single printing operation, to determine a packing arrangement that results in a maximum number of objects to be built in a single printing operation, or the like. In any regard, the computational intensity used to calculate the packing arrangement may be affected by the sizes of the model file of the object and the other objects. That is, the computational intensity may be larger for larger model file sizes as additional data, e.g., control points, may need to be computed for the larger model file sizes.

According to examples, because the processor 102 may use the reduced resolution 3D model file of the object to determine the packing arrangement, the processor 102 may be determine the packing arrangement more efficiently as compared with determining the packing arrangement using the first resolution 3D model file. That is, the processor 102 may determine the packing arrangement while utilizing less computationally intensive calculations, which may result in a reduction in the latency in determining the packing arrangement as well as in printing the object and the other objects. In addition, the reduced resolution 3D model file of the object may require relatively less memory space then the first resolution 3D model file of the object.

In some examples, the processor 102 may also receive reduced resolution 3D model files of the other objects and may use the reduced resolution 3D model files of the object and the other objects to determine the packing arrangement for the object and the other objects. Thus, the processor 102 may further reduce the amount of computationally intensive calculations to determine the packing arrangement. In addition, the reduced resolution 3D model files of the objects may require relatively less memory space than first resolution 3D model files of the objects. As a result, the apparatus 100 may have a relatively smaller memory or data store while still being able to perform similar computations.

In some examples, instead of rendering each of the objects and the other objects independently, the processor 102 may render each unique object once and may replicate the renderings of the unique objects to obtain multiple copies of the unique objects. In addition or alternatively, the processor 102 may execute the packing arrangement determination (e.g., auto-packing operations) based on a predefined objects pool and a number of copies of each object to be built. As such, for instance, all of the 3D rendering data for the objects used for the packing arrangement determination once and may be performed early in a printing process, e.g., at the objects pool building time, during an uploading phase of the objects, or the like. Through rendering the objects in this manner, the latency in printing the objects may also be reduced.

The processor 102 may fetch, decode, and execute the instructions 116 to output the determined packing arrangement for a 3D printing system to print the object and the other objects in the build bed of the 3D printing system. In some examples, the processor 102 may output the determined packing arrangement to a client device to enable the user to modify the determined packing arrangement. In these examples, the processor 102 may receive a modified version of a determined packing arrangement from the client device and may output the modified version of the determined packing arrangement for the 3D printing system to print the objects and the other objects in a single printing operation on a build bed of the 3D printing system.

Figure 2:
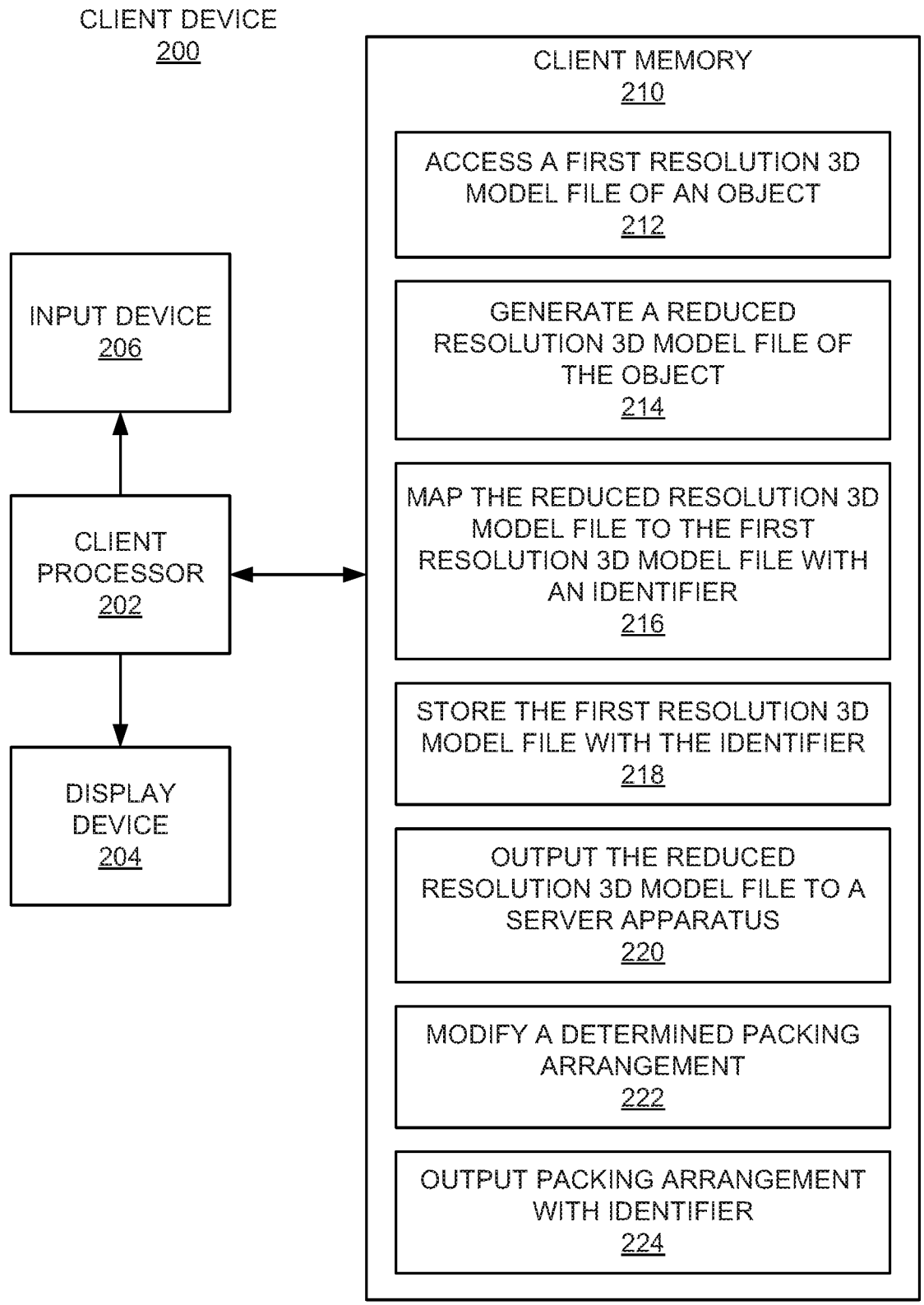
FIG. 2 shows a block diagram of an example client device that may interact with the apparatus depicted in FIG. 1 in determining a packing arrangement for a plurality of objects.

Turning now to FIG. 2, there is shown a block diagram of an example client device 200 that may interact with the apparatus 100 depicted in FIG. 1 in determining a packing arrangement for a plurality of objects. It should be understood that the example client device 200 depicted in FIG. 2 may include additional features and that some of the features described herein may be removed and/or modified without departing from the scope of the client device 200.

Generally speaking, the client device 200 may be a computing device, a laptop computer, a tablet computer, or the like. As shown in FIG. 2, the client device 200 may include a client processor 202 that may control operations of the client device 200. The client processor 202 may be a semiconductor-based microprocessor, a central processing unit (CPU), an application specific integrated circuit (ASIC), a field-programmable gate array (FPGA), and/or other suitable hardware device.

The client device 200 may also include a client memory 210 that may have stored thereon machine readable instructions 212-224 (which may also be termed computer readable instructions) that the client processor 202 may execute. The client memory 210 may be an electronic, magnetic, optical, or other physical storage device that contains or stores executable instructions. The client memory 110 may be, for example, Random Access memory (RAM), an Electrically Erasable Programmable Read-Only Memory (EEPROM), a storage device, an optical disc, and the like. The client memory 110, which may also be referred to as a computer readable storage medium, may be a non-transitory machine-readable storage medium, where the term "non-transitory" does not encompass transitory propagating signals.

The client processor 202 may fetch, decode, and execute the instructions 212 to access a first resolution 3D model file of an object, in which a 3D printing system is to build or print the object using the first resolution 3D model file. The client processor 202 may access the first resolution 3D model file of the object via an upload by a user of the first resolution 3D model file onto the client device 200. In other examples, the client processor 202 may access the first resolution 3D model file of the object from an external data storage device to which the client device 200 may be directly connected or via a network. In any regard, the client processor 202 may display the first resolution 3D model file of the object on a display device 204, e.g., a monitor.

The client processor 202 may fetch, decode, and execute the instructions 214 to generate a reduced resolution 3D model file of the first resolution 3D model file. The client processor 202 may generate the reduced resolution 3D model file through receipt of instructions from a user via an input device 206. The input device 206 may include, for instance, a keyboard, a mouse, a trackpad, or the like, and the instructions may be inputted via a graphical user interface (GUI) displayed on the display device 204. The GUI may include, for instance, options for varying a quality of the first resolution 3D model file, varying a reduction level of the size of the first resolution 3D model file, or the like. By of example, the GUI may include up/down buttons for increasing or decreasing the quality and/or the file size of the first resolution 3D model file. Accordingly, the client processor 202 may generate the reduced resolution 3D model file to have a quality and/or file size as inputted into the GUI by the user. In any regard, the client processor 202 may reduce the size of the first resolution 3D model file by computing a set of geometrical invariants for a given model, for example, center-of-mass, geometric moments, etc., iteratively screen through the configuration parameter space, for example, using a genetic algorithm as a driver, with maximizing file size reduction as an objective, and preserve the geometric invariants as constraints, or the like.

The client processor 202 may fetch, decode, and execute the instructions 216 to map the reduced resolution 3D model file to the first resolution 3D model file with an identifier. That is, for instance, the client processor 202 may assign a unique identifier to the first resolution 3D model file and to the reduced resolution 3D model file. The unique identifier may be a set of characters, e.g., numerals, letters, symbols, combinations thereof, or the like. According to examples, the first resolution 3D model file may be identified using the unique identifier following processing of the lower resolution 3D model file.

The client processor 202 may fetch, decode, and execute the instructions 218 to store the first resolution 3D model file and the mapped identifier. The client processor 202 may store the first resolution 3D model file and the mapped identifier on a data store that is locally connected to the client processor 202. In addition or in other examples, the client processor 202 may store the first resolution 3D model file on a network attached data store. In any regard, the first resolution 3D model file may be accessed via the identifier.

The client processor 202 may fetch, decode, and execute the instructions 220 to output the reduced resolution 3D model file to a server apparatus, e.g., the apparatus 100. Particularly, for instance, the client processor 202 may communicate the reduced resolution 3D model file via a network (not shown) to the server apparatus. As discussed herein, the server apparatus 100 may determine a packing arrangement for the object and for a plurality of other objects using the reduced resolution 3D model file of the object as well as reduced resolution 3D model files of the other objects. The determined packing arrangement may include a visual representation of the reduced resolution 3D model files of the object and the other objects positioned in the determined packing arrangement. In addition, the server apparatus 100 may output the determined packing arrangement back to the client device 200.

The client processor 202 may fetch, decode, and execute the instructions 222 to modify the determined packing arrangement. That is, for instance, the client processor 202 may execute changes to the packing arrangement made by a user via the input device 207. For instance, a user may input instructions through the input device to rotate the packing arrangement, move and/or remove one or more of the representations of the reduced resolution 3D model files in the determined packing arrangement. As the packing arrangement includes representations of the reduced resolution 3D model files, which may have a significantly smaller file size than a packing arrangement that includes representations of first resolution 3D model files of the objects, the client processor 202 may use a relatively smaller amount of computational resources in the manipulation of the packing arrangement.

The client processor 202 may fetch, decode, and execute the instructions 224 to output the packing arrangement with the mapped identifier or multiple mapped identifiers to a 3D printing system. Particularly, for instance, the client processor 202 may output a modified or an unmodified version of the determined packing arrangement to the 3D printing system. Again, as the outputted packing arrangement may have a relatively smaller file size than a packing arrangement generated using regular resolution 3D model files, the amount of data and network bandwidth usage may be relatively reduced as compared with using the regular resolution 3D model files.

Figure 3:
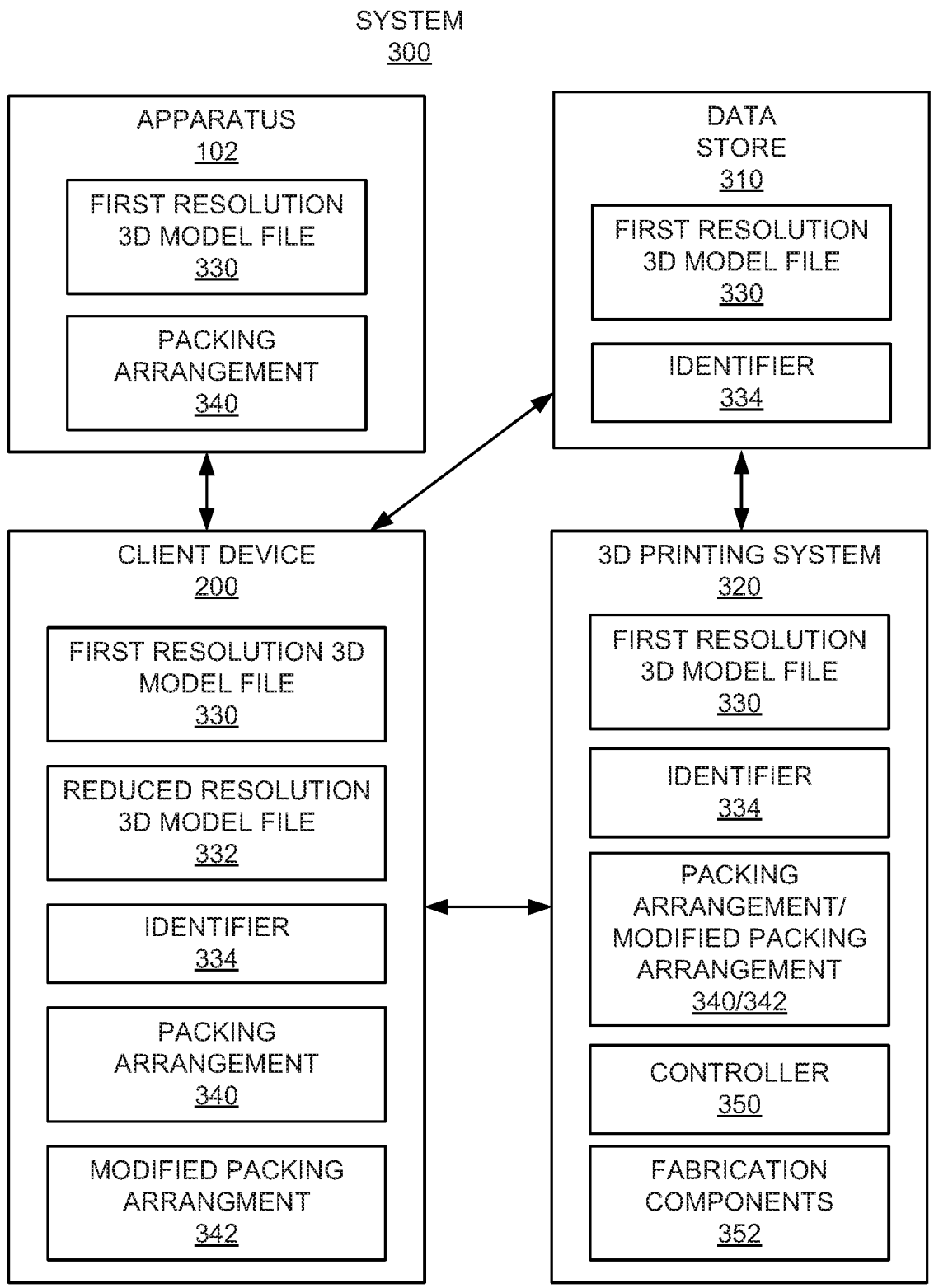
FIG. 3 shows a block diagram of an example system for generating a packing arrangement for multiple objects, visualizing the packing arrangement, manipulating the packing arrangement, and printing multiple objects in a print bed of a 3D printing system.

With reference now to FIG. 3, there is shown a block diagram of a system 300 for a generating a packing arrangement for multiple objects, visualizing the packing arrangement, manipulating the packing arrangement, and printing multiple objects in a print bed of a 3D printing system. It should be understood that the example system 300 depicted in FIG. 3 may include additional features and that some of the features described herein may be removed and/or modified without departing from the scope of the system 300. Although particular reference is made herein to the apparatus 100 and the client device 200 performing various functions, it should be understood that these descriptions may also be construed as the processor 102 and/or the client processor 202 performing those functions.

As shown in FIG. 3, the system 300 may include the apparatus 100 depicted in FIG. 1 and the client device 200 depicted in FIG. 2. The system 300 may also include a data store 310 and a 3D printing system 320. The printing system 320 may be an additive manufacturing machine that includes a build zone, within which, the 3D printing system 320 may fabricate a plurality of objects concurrently. For instance, the 3D printing system 320 may include a relatively large print bed such that the 3D printing system 320 may fabricate a relatively large number of objects concurrently. Examples of suitable additive manufacturing machines may include, an inkjet based machine, a selective laser sintering machine, or the like.

As discussed herein, the client device 200 may access a first resolution 3D model file 330 of an object to be built with additional objects in a build bed of the 3D printing system 320. The client device 200 may also generate a reduced resolution 3D model file 332 of the first resolution 3D model file 330. For instance, a user may input a desired resolution reduction level and the client device 200 may reduce the resolution level, and therefore, the file size, of the first resolution 3D model file 332 according to the desired resolution reduction level to generate the reduced resolution 3D model file 332. By way of particular example, the user may be presented with an option to select a number between 1 to 10, in which each of the numbers corresponds to a particular quality level reduction. In addition or alternatively, the user may be presented with an option to input a selected percentage reduction of the first resolution file size.

As also discussed herein, the client device 200 may map the reduced resolution 3D model file 332 to the first resolution 3D model file 330 with an identifier 334. In addition, the client device 200 may store the first resolution 3D model file 330 and the identifier 334 in the data store 310, which may be directly connected to the client device 200 or may be connected via a network to the client device 200. Following storage of the first resolution 3D model file 330 in the data store 310, the client device 200 may delete the first resolution 3D model 330 from the client device 200 to, for instance, reduce an amount of storage space occupied in the client device 200. In any regard, the mapping or the correlation between the identifier 334 and the first resolution 3D model file 330 may be stored in the data store 310 such that the first resolution 3D model file 330 may be accessed through the identifier 334.

The client device 200 may also communicate a copy of the reduced resolution 3D model file 332 to the apparatus 100, for instance, through a network. The client device 200 may further communicate a copy of the identifier 334 to the apparatus 100 such that the apparatus 100 may maintain a correlation between the first resolution 3D model file 330 and the reduced resolution 3D model file 332 in the generated packing arrangement 340. In some examples, however, the client device 200 and the apparatus 100 may be a single apparatus such that the single apparatus may perform the functions of the apparatus 100 and the client device 200 discussed herein. In any regard, the apparatus 100 may execute a packing operation using the reduced resolution 3D model file 332 to generate a packing arrangement 340 for the object and additional objects to be built in a build envelope of the 3D printing system 330. In generating the packing arrangement 340, the apparatus 100 may also use reduced 3D model files of the additional objects. As the reduced 3D model files of the object and the additional objects may have relatively smaller file sizes as compared with the first resolution 3D model files of the objects, the packing operation may be implemented relatively more efficiently and with relatively less computing resources to generate the packing arrangement 340.

The apparatus 100 may communicate the generated packing arrangement 340 to the client device 200. In addition, the client device 200 may display the generated packing arrangement 340 to a user and the user may manipulate the packing arrangement 340 through, for instance, movement of the displayed representation of the object and/or the displayed representation of an additional object. The client device 200 may also save a modified packing arrangement 342, which may include the user-directed changes, if any.

The client device 200 or the apparatus 100 may receive an instruction to print the object and the additional objects in the generated packing arrangement 340 or the modified packing arrangement 342. Based on receipt of the instruction to print the object and the additional objects, the client device 200 or the apparatus 100 may send the packing arrangement 340 or the modified packing arrangement 342 to the 3D printing system 320 along with the identifier 334 of the first resolution 3D model file 330 and any other identifier of the first resolution 3D model files of the additional objects in the packing arrangement 340/342. Thus, for instance, the client device 200 or the apparatus 100 may not send the first resolution 3D model file 330 of the object or the first resolution 3D model files of the additional objects to the 3D printing system 320.

Instead, the client device 200 or the apparatus 100 may send the packing arrangement 340/342 having the reduced resolution 3D model file 332 of the object and, in some examples, the reduced resolution 3D model files 332 of the additional objects. The 3D printing system 320 may use the identifier 334 to access the first resolution 3D model file 330 of the object stored in the data store 310. The 3D printing system 320 may also download the first resolution 3D model file 330 from the data store 310. In addition, the 3D printing system 320 may use identifiers of the first resolution 3D model files of the additional objects to access and download the first resolution 3D model files of the additional objects. Moreover, the 3D printing system 320 may use the first resolution 3D model files to print the object and the other objects in the determined packing arrangement 340/342. In this regard, the 3D printing system 320 may print the object and the other objects at their intended resolutions, while also, for instance, maximizing a number of the objects printed during a single printing operation.

The 3D printing system 320 may be implemented to fabricate parts of 3D objects from particles of build material, which may also be termed build material particles. The particles of build material may include any suitable material including, but not limited to, a polymer, a plastic, a ceramic, a nylon, a metal, combinations thereof, or the like, and may be in the form of a powder or a powder-like material. Additionally, the particles may be formed to have dimensions, e.g., widths, diameters, or the like, that are generally between about 5 µm and about 100 µm. In other examples, the particles may have dimensions that are generally between about 30 µm and about 60 µm. The particles may have any of multiple shapes, for instance, as a result of larger particles being ground into smaller particles. In some examples, the powder may be formed from, or may include, short fibers that may, for example, have been cut into short lengths from long strands or threads of material.

The 3D printing system 320 may include a controller 350 and fabrication components 352. In some examples, the fabrication components 352 may include a fusing agent delivery system. The fabrication components 352 may also or in other examples include an energy supply system. In particular examples, the fabrication components 352 may include a laser beam device. In any of these examples, the fabrication components 352 may be implemented to solidify particles in selected locations of a build envelope to fabricate the objects. The fabrication components 352 may fabricate the objects in conjunction with each other in a common build envelope, e.g., in a common fabrication cycle, process, etc. In other words, the fabrication components 352 may fabricate the objects identified in a packing arrangement 340/342 concurrently.

Figure 4:
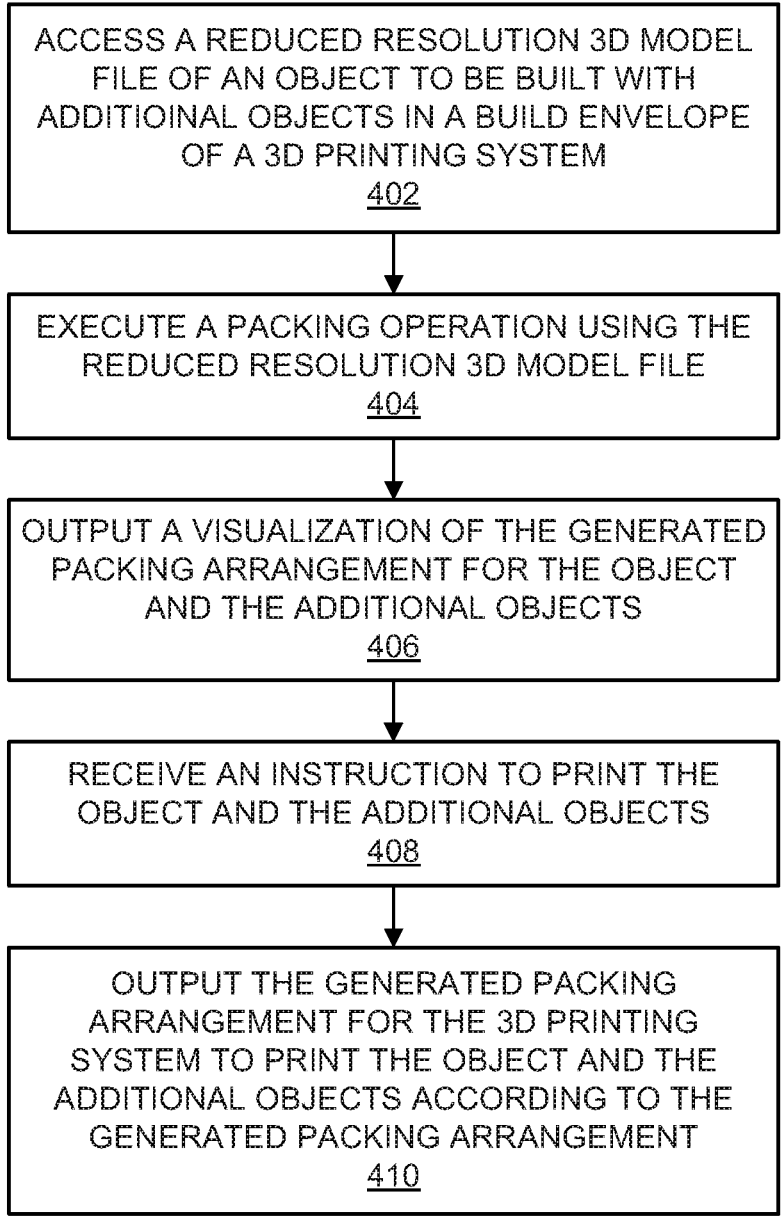
FIG. 4 depicts a flow diagram of an example method for a packing arrangement for multiple objects, visualizing the packing arrangement, manipulating the packing arrangement, and printing multiple objects in a print bed of a 3D printing system.

Various manners in which the processor 102, the client processor 202, and the printing system 320 may operate are discussed in greater detail with respect to the method 400 depicted in FIG. 4. Particularly, FIG. 4 depicts a flow diagram of an example method 400 for generating a packing arrangement for multiple objects, visualizing the packing arrangement, manipulating the packing arrangement, and printing multiple objects in a print bed of a 3D printing system 320. It should be understood that the method 400 depicted in FIG. 4 may include additional operations and that some of the operations described therein may be removed and/or modified without departing from the scope of the method 400. The description of the method 400 is made with reference to at least some of the features depicted in FIGS. 1-3 for purposes of illustration.

At block 402, the processor 102 may access a reduced resolution 3D model file 332 of an object to be built with additional objects in a build envelope of a 3D printing system 320. As discussed above, the processor 102 may access the reduced resolution 3D model file 332 from a client device 200. In addition, the processor 102 may access reduced resolution 3D model files of the additional objects from the client device 200 or from multiple client devices.

At block 404, the processor 102 may execute a packing operation using the reduced resolution 3D model file 332. In some examples, the processor 102 may execute a packing operation also using the reduced resolution 3D model files of the additional objects. As discussed herein, the processor 102 may also clone some or all of the rendered versions of the reduced resolution 3D model files to generate a plurality of model files to be included in the packing arrangement.

At block 406, the processor 102 may output a visualization of the generated packing arrangement 340 for the object and the additional objects. In some examples, the processor 102 may display the generated packing arrangement 340 on a display device. In other examples, the processor 102 may output the visualization to the client device 200 and the client processor 202 may display the visualization of the determined packing arrangement 340. In some examples, a user may manipulate the determined packing arrangement 340, for instance, by moving one or more of the representations of the objects in the determined packing arrangement 340. In addition, the client processor 202 may store the modified packing arrangement 342.

At block 408, the processor 102 may receive an instruction to print the object and the additional objects. Based on receipt of the instruction, the processor 102 may output the generated packing arrangement 340 or the modified packing arrangement 342 as indicated at block 410. For instance, the processor 102 may output the generated packing arrangement 340/342 to the 3D printing system 320 or the processor 102 may forward the instruction to the client device 200 and the client device 200 may instruct the 3D printing system 320 to print the objects. In either of these examples, the packing arrangement 340/342 may be communicated to the 3D printing system 320 along with the identifier or identifiers of the first resolution 3D model file(s) 330 to which the reduced resolution 3D model file(s) 332 in the packing arrangement 340/342 are mapped. In addition, the controller 350 of the printing system 320 may access and download the first resolution 3D model file(s) 330 and may control the fabrication components 352 to print the objects using the first resolution 3D model file(s) 330.

Some or all of the operations set forth in the method 400 may be contained as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
    processor; and
    a memory storing machine readable instructions that when executed by the processor cause the processor to:
    access reduced resolution three-dimensional (3D) model files of objects that are to be built together in a build bed of a 3D printing system, wherein the reduced resolution 3D model files are reduced resolution files of full resolution 3D model files of the objects and are usable to generate reduce resolution models of the objects having reduced file sizes as compared to full resolution models generated by the full resolution 3D model files;
    determine a packing arrangement of the objects to be built in the build bed through use of the reduced resolution 3D model files for all of the objects in the build bed, including adjusting an arrangement of the reduced resolution models of the objects in the build bed to result in a maximum number of the objects being built during a single printing operation of the 3D printing system; and
    output the determined packing arrangement of the objects to the 3D printing system, wherein the determined packing arrangement of the objects is used to adjust an operation of the 3D printing system to cause the 3D printing system to print the objects according to the determined packing arrangement.

2. The apparatus of claim 1, wherein the instructions are further executable to cause the processor to:
    receive a modified version of the determined packing arrangement; and
    output the modified version of the determined packing arrangement to the 3D printing system for the 3D printing system to print the objects.

3. The apparatus of claim 1, wherein the instructions are further executable to cause the processor to:
    prior to outputting the determined packing arrangement to the 3D printing system, output the determined packing arrangement to a client device, wherein the client device is to modify the determined packing arrangement and output a modified version of the determined packing arrangement;
    receive the modified version of the determined packing arrangement from the client device; and
    output the modified version of the determined packing arrangement to the 3D printing system for the 3D printing system to print the objects.

4. The apparatus of claim 1, wherein the instructions are further executable to cause the processor to:
    receive an instruction to print the objects in the determined packing arrangement; and
    output the determined packing arrangement to the 3D printing system based on receipt of the instruction.

5. The apparatus of claim 1, wherein the instructions are further executable to cause the processor to:
    access identifiers that map the reduced resolution 3D model files to the full resolution 3D model files of the objects; and
    output the identifiers with the determined packing arrangement, wherein the 3D printing system is to access the full resolution 3D model files of the objects using the identifiers and to print the objects based on the full resolution 3D model files.

6. The apparatus of claim 5, wherein the full resolution 3D model files are stored in a data storage separate from the apparatus and wherein the 3D printing system is to access the full resolution 3D model files from the data storage.

7. The apparatus of claim 1, wherein the instructions are further executable to cause the processor to:
    render the reduced resolution 3D model files and to clone the rendered reduced resolution 3D model files to generate multiple copies of the reduced resolution 3D model files; and
    determine the packing arrangement using the generated multiple copies of the reduced resolution 3D model files.

8. A method comprising:
    accessing, by processor, reduced resolution three-dimensional (3D) model files of objects to be built together in a build envelope of a 3D printing system, the reduced resolution 3D model files being reduced resolution files of full resolution 3D model files of the objects and being usable to generate reduced resolution models of the objects having reduced file sizes as compared to full resolution models generated by the full resolution 3D model files;
    executing, by the processor, a packing operation using the reduced solution 3D model files for all of the objects to generate a packing arrangement for the objects in the build envelope of the 3D printing system, including adjusting an arrangement of the reduced resolution models of the objects in the build envelope to result in a maximum number of the objects being built during a single printing operation of the 3D printing system;
    outputting, by the processor, a visualization of the generated packing arrangement for the objects; and
    based on receipt of an instruction to print the objects, outputting, by the processor, the generated packing arrangement for the objects to the 3D printing system, wherein the generated packing arrangement is used to adjust an operation of the 3D printing system to cause the 3D printing system to print the objects according to the generated packing arrangement.

9. The method of claim 8, further comprising:
    rendering the reduced resolution 3D model files of the objects;
    cloning the rendered reduced resolution 3D model files to generate multiple copies of the rendered reduced resolution 3D model files; and
    wherein executing the packing operation further comprises executing the packing operation on the generated multiple copies of the rendered reduced resolution 3D model files.

10. The method of claim 8, wherein the reduced resolution 3D model files are reduced to a user-defined level via a client device, the method further comprising:
    generating, by the client device, specific identifiers to map the reduced resolution 3D model files to the full resolution 3D model files; and sending, by the client device, the reduced resolution 3D model files to a server, wherein the server includes the processor, and wherein the full resolution 3D model files are stored on a data storage that is separate from the server and are accessible via the specific identifiers.

11. A system comprising:

a client device to:

access full resolution three-dimensional (3D) model files of objects to be built together in a build bed of a 3D printing system;

generate reduced resolution 3D model files from the full resolution 3D model files of the objects;

map the reduced resolution 3D model files to the full resolution 3D model files with specific identifiers; and output the reduced resolution 3D model files to a server apparatus; and the server apparatus to:

access the reduced resolution 3D model files, wherein the reduced resolution 3D model files are usable to generate reduced resolution models of the objects having reduced file sizes as compared to full resolution models generated by the full resolution 3D model files;

execute a packing operation using the reduced resolution 3D model files for all of the objects to determine a packing arrangement for the objects in the build bed of the 3D printing system, including adjusting an arrangement of the reduced resolution models of the objects in the build bed to result in a maximum number of the objects being built during a single printing operation of the 3D printing system; and output the determined packing arrangement to the 3D printing system, wherein the determined packing arrangement is used to adjust an operation of the 3D printing system to cause the 3D printing system to print the objects according to the determined packing arrangement.

12. The system of claim 11, wherein the objects are associated with identifiers that map the reduced resolution 3D model files of the objects to the full resolution 3D model files of the objects, wherein the server apparatus is further to execute the packing operation using the reduced resolution 3D model files of all of the objects to determine the packing arrangement and to output the determined packing arrangement and the associated identifiers of the objects in the determined packing arrangement to the client devoice, and wherein the client device is to send the determined packing arrangement and the associated identifiers to the 3D printing system for the 3D printing system to print the objects using the determined packing arrangement.

13. The system of claim 11, wherein, prior to outputting the determined packing arrangement to the 3D printing system, the server apparatus is to output the determined packing arrangement to the client device, and wherein the client device to modify or manipulate the determined packing arrangement and send the modified or manipulated packing arrangement to the server apparatus.

\* \* \* \* \*